US008056710B2

(12) United States Patent
Schneider et al.

(10) Patent No.: US 8,056,710 B2
(45) Date of Patent: Nov. 15, 2011

(54) KIT ADAPTED FOR USE IN A VEHICLE GLOVE COMPARTMENT BOX

(76) Inventors: Peter Schneider, Houston, TX (US); Garland Keith Grady, The Woodlands, TX (US)

(*) Notice: Subject to any disclaimer, the term of this patent is extended or adjusted under 35 U.S.C. 154(b) by 580 days.

(21) Appl. No.: 11/780,306

(22) Filed: Jul. 19, 2007

(65) Prior Publication Data

US 2008/0067085 A1    Mar. 20, 2008

Related U.S. Application Data

(60) Provisional application No. 60/831,902, filed on Jul. 19, 2006.

(51) Int. Cl.
*B65D 71/12* (2006.01)
*B65D 85/38* (2006.01)

(52) U.S. Cl. ............... 206/223; 206/232; 206/316.2; 206/733

(58) Field of Classification Search .............. 206/223, 206/232, 316.2, 733, 734, 775
See application file for complete search history.

(56) References Cited

U.S. PATENT DOCUMENTS

| | | | |
|---|---|---|---|
| 752,463 A | | 2/1904 | Morris |
| 2,464,951 A | * | 3/1949 | Stengren ................ 206/765 |
| 2,844,473 A | * | 7/1958 | Seiferth et al. ............. 426/121 |
| 3,675,763 A | * | 7/1972 | Sandel .................... 206/387.11 |
| 3,682,297 A | * | 8/1972 | Austin et al. ............. 206/387.11 |
| 4,097,611 A | * | 6/1978 | Seiferth et al. ............. 426/121 |
| 4,739,353 A | * | 4/1988 | Heuer et al. .............. 206/316.2 |
| 4,925,087 A | * | 5/1990 | Ostrander ................ 229/120.03 |
| 5,421,460 A | | 6/1995 | Bosshard |
| 5,483,442 A | * | 1/1996 | Black et al. ................. 700/90 |
| 5,515,974 A | | 5/1996 | Higson |
| 5,738,211 A | * | 4/1998 | Ichino et al. ............. 206/316.2 |
| 5,992,620 A | | 11/1999 | Holtom |
| 6,474,539 B1 | * | 11/2002 | Van Der Horst ......... 229/120.14 |
| D481,054 S | | 10/2003 | Hennig |
| 6,923,316 B2 | * | 8/2005 | Carty et al. .............. 206/232 |
| 7,353,938 B2 | * | 4/2008 | Moldolan .................. 206/232 |
| 2002/0181956 A1 | | 12/2002 | Simpson, III |
| 2003/0094385 A1 | | 5/2003 | Moldovan |
| 2005/0053373 A1 | | 3/2005 | Ueyama et al. |
| 2006/0011436 A1 | | 1/2006 | Orman |

OTHER PUBLICATIONS www.business-in-a-box.com.

* cited by examiner

*Primary Examiner* — J. Gregory Pickett
*Assistant Examiner* — Ernesto Grano
(74) *Attorney, Agent, or Firm* — Bracewell & Giuliani LLP

(57) ABSTRACT

This invention relates to a kit and methods adapted for use in a vehicle glove compartment box, which provides assistance in various vehicular scenarios related to traffic tickets, DWIs, car wrecks, avoiding repossessions, and using lemon laws. The kit includes a container, camera, and booklet and is small enough to fit conveniently inside a vehicle glove box. The booklet contains sequential step-by-step instructions to assist the user with the vehicular scenarios and is written in a simple and easy-to-read format that does not require a legal dictionary to decipher. In simpler terms, the present invention provides common sense tips to help protect one's legal rights.

9 Claims, 9 Drawing Sheets

KIT ADAPTED FOR USE IN A VEHICLE GLOVE COMPARTMENT BOX

BACKGROUND OF THE INVENTION

1. Field of Invention

The present invention relates to a kit and method adapted for use in vehicular applications.

2. Related Art

Life can be filled with unpleasant circumstances which demand attention. During a lifetime of driving, an individual may be confronted with traffic tickets, car wrecks, purchasing a lemon, or, unfortunately, even being involved in a repossession or DWI. When confronted with these issues, one may be unsure of the various legalities and practical considerations involved. For example, one may be unaware of what to say or admit to the officer, whether to pursue an uninsured driver, or when to remain silent.

Other kits have attempted to address similar needs. The Business in a Box™ is such a kit and can be found at www-.business-in-a-box.com. It provides a collection of business document templates which address cover letters, contracts, policies, spreadsheets, board resolutions, and checklists. However, this kit fails to address the before-mentioned vehicular needs. For example, although it may be small enough to fit inside a glove compartment box, the Business in a Box™ kit fails to provide clear, step-by-step instructions for dealing with traffic tickets, car wrecks, repossessions, purchasing lemons, and DWIs. Rather, the Business in a Box™ only addresses corporate concerns and has nothing to do with vehicular scenarios. Therefore, the inventors of the present application realized there is a need in the art for a quick and efficient, easy-to-understand guide to approaching these vehicular issues. The present invention addresses those needs.

SUMMARY OF THE INVENTION

In view of the foregoing, embodiments of the present invention provide a kit small enough to be positioned within a glove compartment box of a vehicle. The kit includes a booklet, camera, and a container. The booklet contains step-by-step pre-selected legal instructions to assist a user in protecting his or her legal rights. The booklet is written in a simple and easy-to-read-format that does not require a legal dictionary to decipher. In simpler terms, it provides common sense tips to help protect one's legal rights.

A method of using a kit according to an embodiment of the present invention includes removing the kit from a vehicle glove box in response to a vehicular scenario. The kit includes the container, camera, and booklet. Once the kit has been removed from the glove compartment box, a user can remove the camera and booklet from the container, use the sequential step-by-step instructions to assist the user in responding to the vehicular scenario, and use the camera to take pictures of the vehicle, surrounding area, and accident scene, thereby preserving vital evidence.

Another method of using the kit according to an embodiment of the present invention includes inserting a camera into an open end of a container, wherein a size of the container is small enough to allow the container to fit conveniently inside the glove compartment box of the vehicle, inserting a booklet into the open end of the container, the booklet having pre-selected legal instructions related to vehicular scenarios, and the booklet is further arranged in a pre-selected format to outline sequential steps to take in response to the vehicular scenarios and further comprises a pre-selected section to write information related to the vehicular scenarios, promoting and distributing the kit, and selling the kit.

BRIEF DESCRIPTION OF THE DRAWINGS

Some of the objects and advantages of the present invention having been stated, others will become apparent as the description proceeds when taken in conjunction with the accompanying drawings, in which.

DETAILED DESCRIPTION

The present invention now will be described more fully hereinafter with reference to the accompanying drawings in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As illustrated in the FIGS. 1-13, and as described herein, embodiments of the kit and methods of the present invention can be applicable to various vehicle including, for example, cars, sports utility vehicles, and vans. As understood by those skilled in the art, however, the present invention could also be applicable to other transportation means, including, for example, motorcycles, tractor trailers, or any other vehicle.

Figure 8:
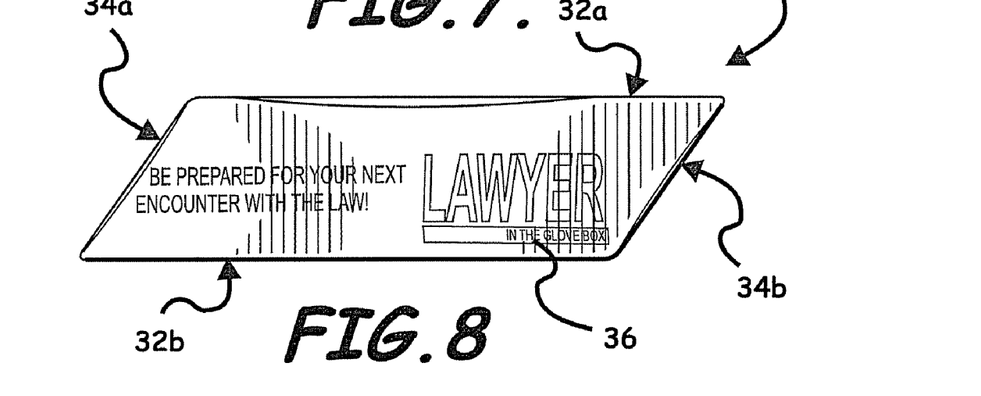
FIG. 8 is a perspective view of the bottom of the kit container along the y,z plane.
Figure 9:
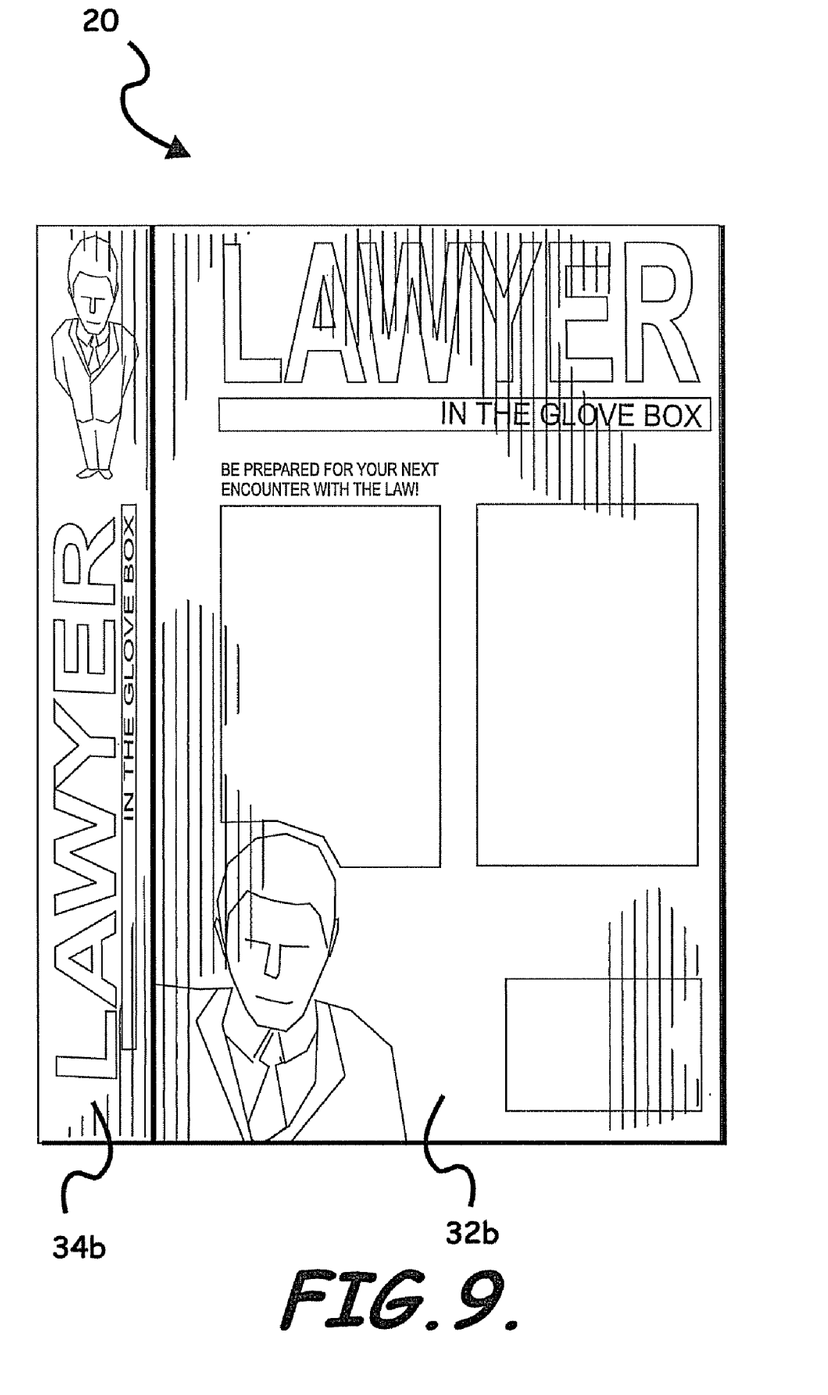
FIG. 9 is a perspective view showing the rear of the kit container along the x,z plane.

This kit and method is adapted for use in a vehicle glove compartment box. As illustrated in the figures, the kit 20 comprises a container 22, booklet 26, and camera 24. Although not illustrated, a box filling or packing can be included in the container to provide additional support for the structure of the container. The container 22 can take any shape small enough to allow the kit to fit conveniently inside a glove box. However, in its most preferred embodiment, the container comprises a parallelogram shape that allows it to fit conveniently inside a glove box as illustrated in FIG. 8. The parallelogram shape is also advantageous in that it allows the kit to fit nicely into an angled glove compartment box. The parallelogram shape is best illustrated in FIG. 8, which illustrates the container bottom 36 showing opposing parallel sidewalls 32A and 32B and opposing parallel sidewalls 34A and 34B.

The container 22 can be made out of any suitable material. In its most preferred embodiment, the container 22 is made of plastic or cardboard and is decorated with various information addressing the kit's usefulness. This information includes the "Lawyer In The Glove Box" trademark, an illustration of the booklet, an illustration of a person resembling a lawyer, and other marketing information related to the contents and usefulness of the kit.

Figure 6:
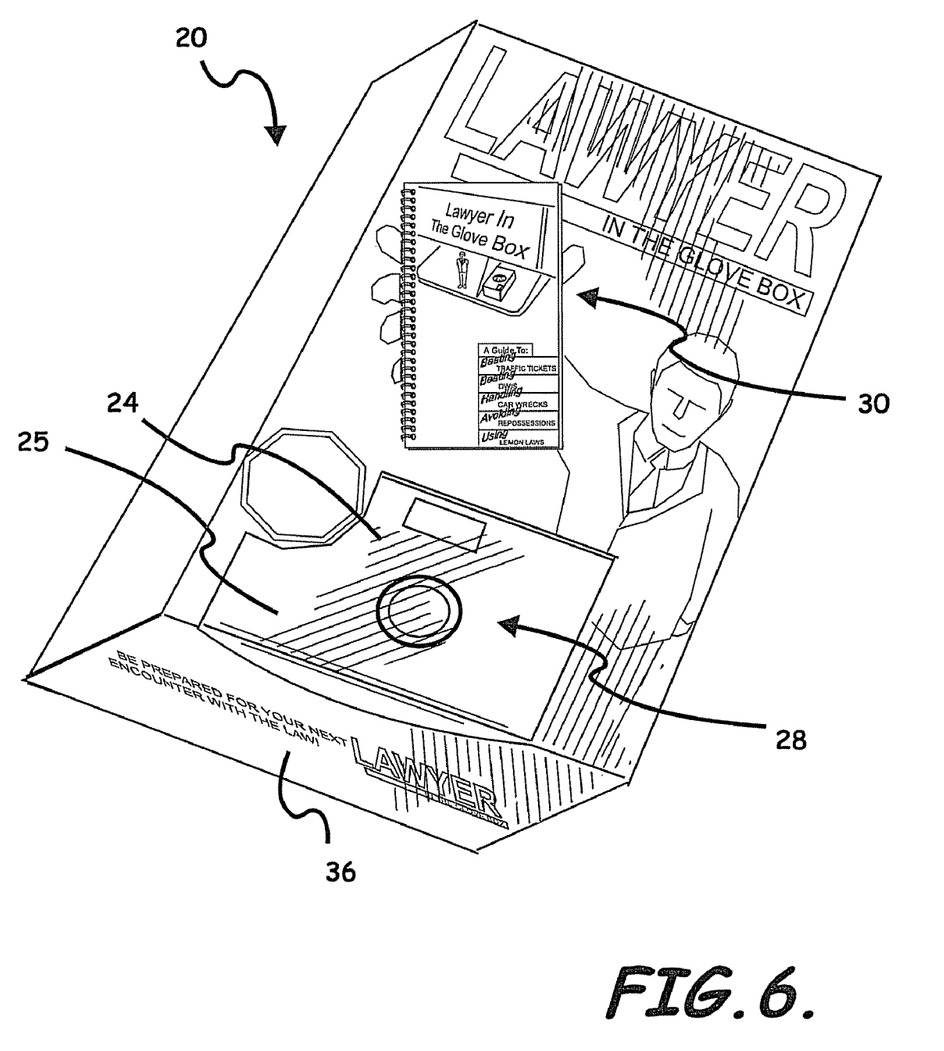
FIG. 6 is a perspective view illustrating the kit.
Figure 7:
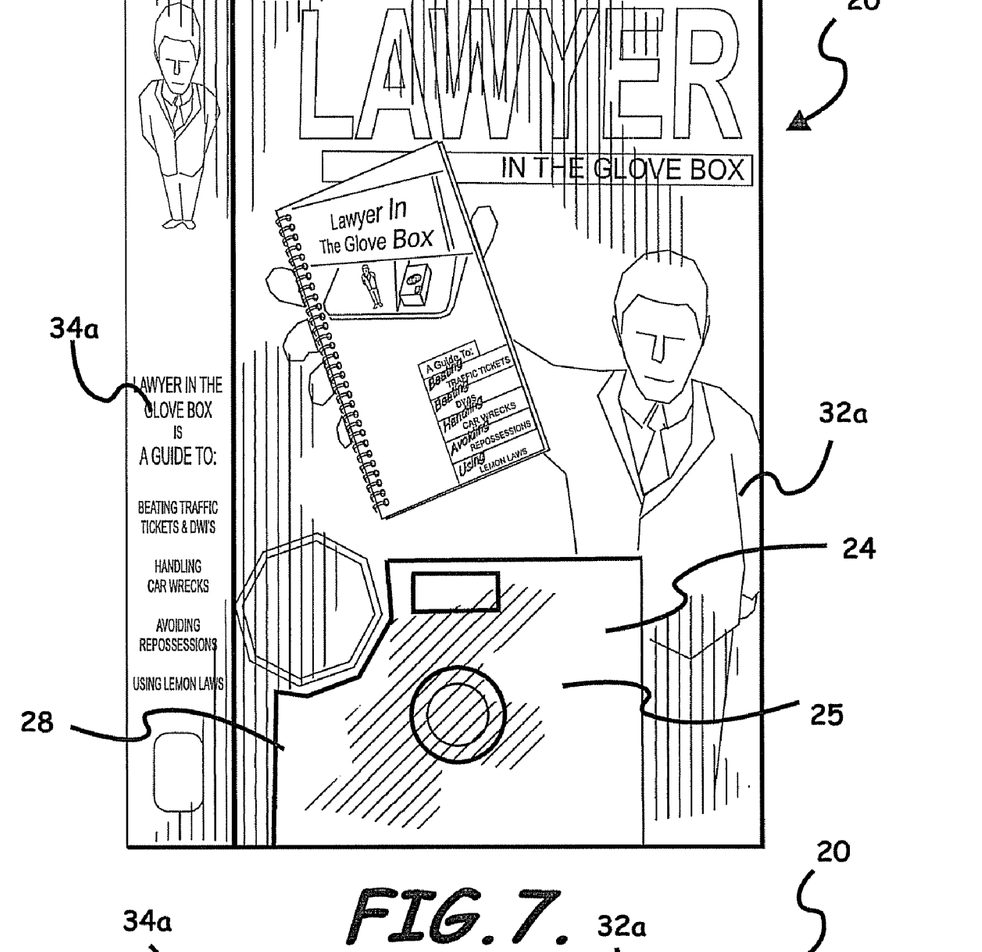
FIG. 7 is a perspective view showing the front of the kit container along the x,z plane.

The container 22 also comprises a front open portion 28 and a front non-opened portion 30. The front non-opened portion 30 contains some of the illustrations previously discussed, while the front opened portion allows the user to view the camera as shown in FIG. 6. The camera can be any suitable type, including disposable cameras, digital cameras, etc. The camera can also be enclosed within its own individual inner container, illustrated by camera packaging 25, which could comprise any suitable material. However, in its most preferred embodiment, it is a plastic or cellophane enclosure used to protect the camera from outside elements.

A booklet 26 and camera 24 are enclosed within the container 22. The booklet 26 contains sequential, pre-selected, step-by-step instructions 27 which assist a user in handling various vehicular scenarios. The booklet contains a table of contents which indexes information related to traffic tickets, DWIs, Car Wrecks, Repossessions, and Lemon Laws. The table of contents allows the user to quickly and efficiently find the section of the booklet addressing his or her problem.

Figure 10:
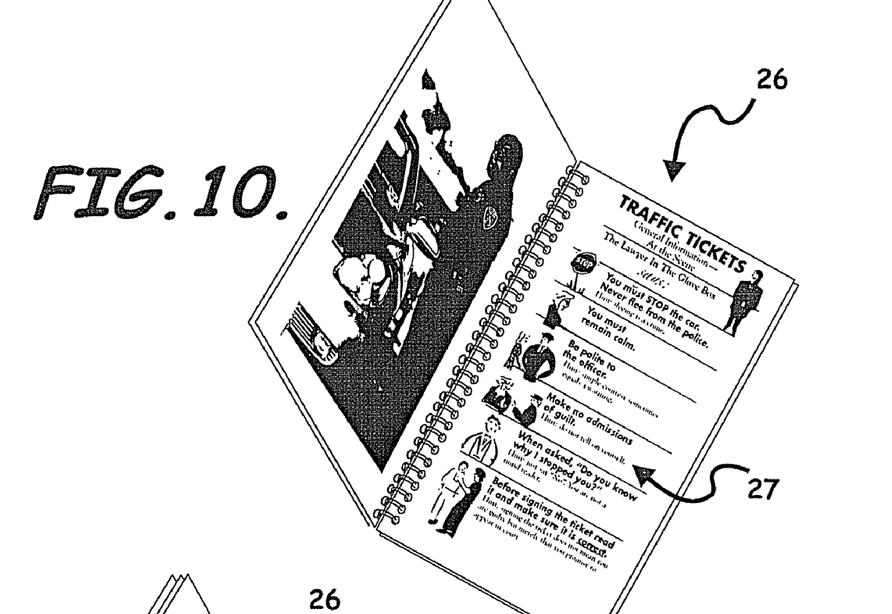
FIGS. 10 and 11 illustrate the contents of the booklet.
Figure 11:
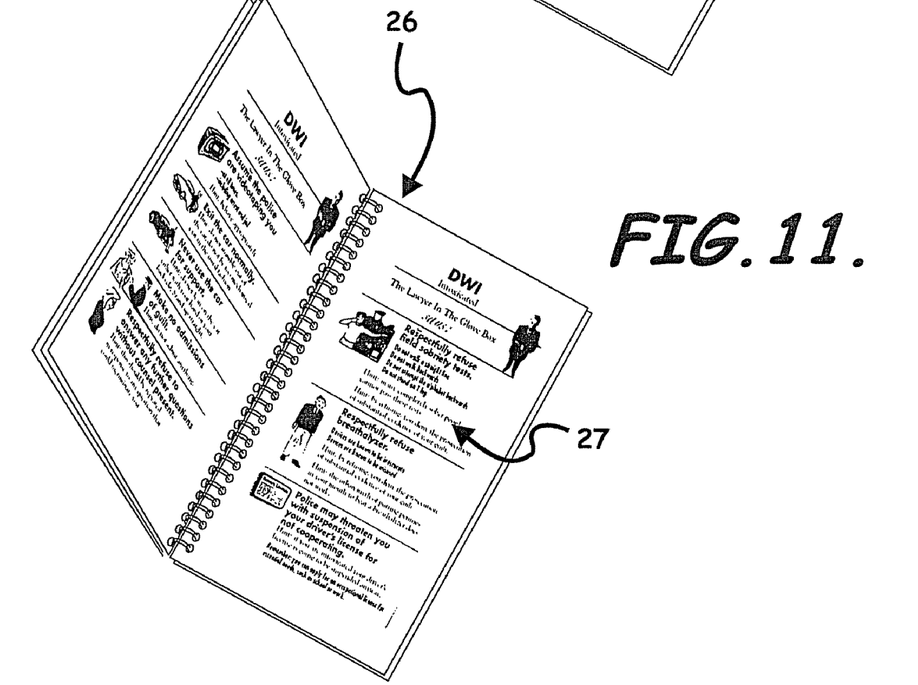
Figure 12:
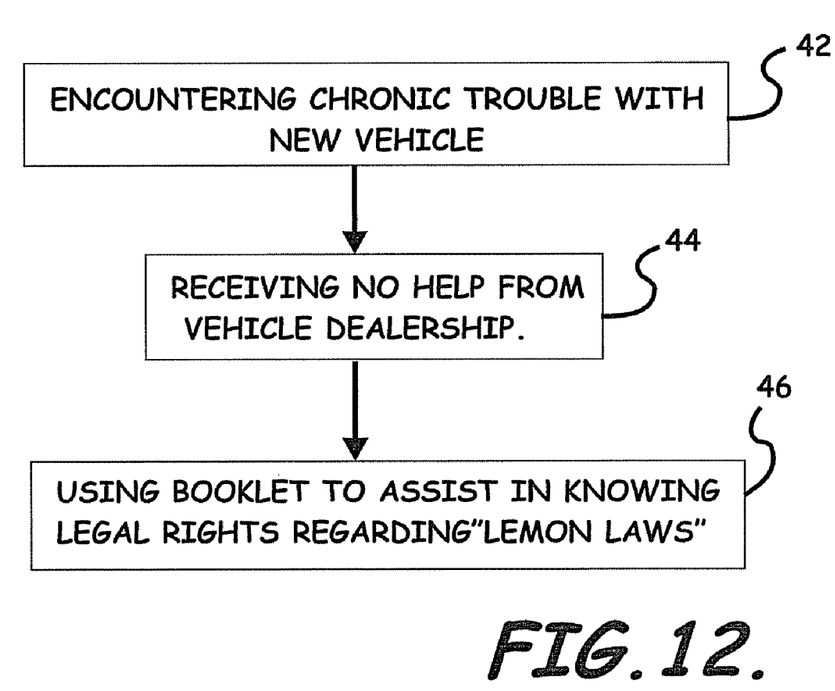
FIGS. 12 and 13 is a flow chart illustrating certain methods of the present inventions.
Figure 13:
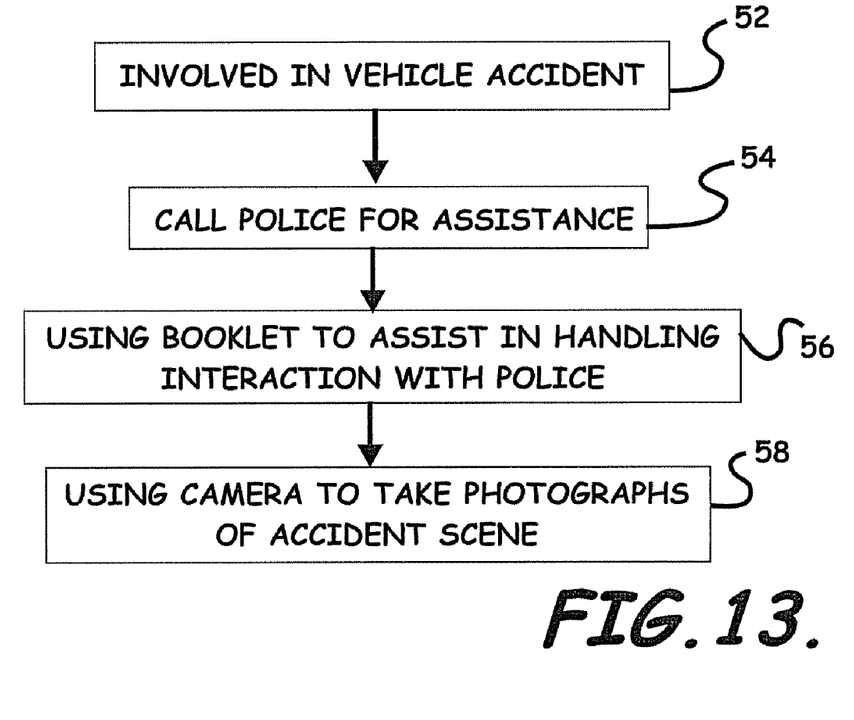

As illustrated in FIGS. 10 and 11, the step-by-step instructions 27 will be described now. The section covering traffic tickets begins with general information addressing what to do when you are stopped by the police. For example, the booklet discusses how you must stop the car and never flee from police, be polite to the officer, and what to do before signing a ticket. The booklet 26 goes on to inform the user to make diagrams of the scene, notes, and to take photographs. Also, the booklet 26 goes on to discuss what to do at the initial hearing and trial.

The section addressing DWIs discusses tips related to general information and what to do when you are intoxicated and when you are not intoxicated. For example, this information can include keeping your license handy, what to do when asked "have you been drinking", always assuming the stop is being taped, never using the car for support, and how to respectfully refuse sobriety tests.

The section addressing car wrecks discusses tips related to general information, what to do when the accident is and is not your fault, and insurance issues. For example, this information can include moving your car to a safe area, make no offers to pay, getting insurance information, getting witness info, and calling your insurance agency. This section can even include information discussing what to do if you do not have insurance.

The section addressing repossessions discusses tips related to general information, loan agreements, and the repossession itself. For example, these tips can address avoiding repossession, alternative payment options, and what the repossession agent can and cannot do when attempting to repossess the vehicle.

The section addressing lemon laws discusses tips related to general information and what to do when you suspect your car is a lemon. For example, this information can include obtaining copies of all repair orders, when to contact dealer service managers, and state laws relating to lemon laws. At the rear of the booklet, there is a section to insert notes.

Figures 1, 2:
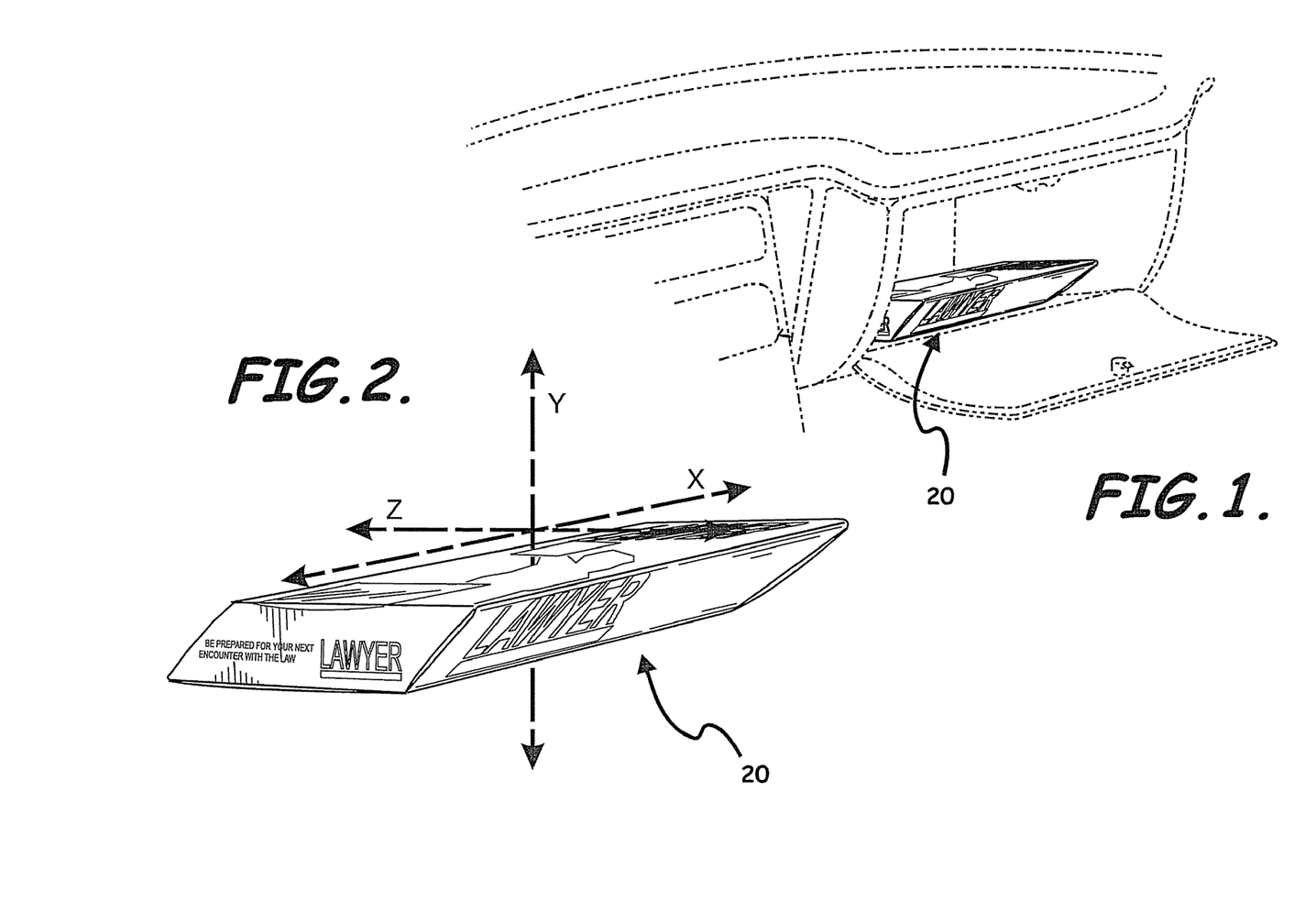
FIG. 1 is a perspective view showing the kit positioned within a vehicle glove compartment box.
FIG. 2. is a perspective view showing the x, y, and z axes of the kit.
Figure 3:
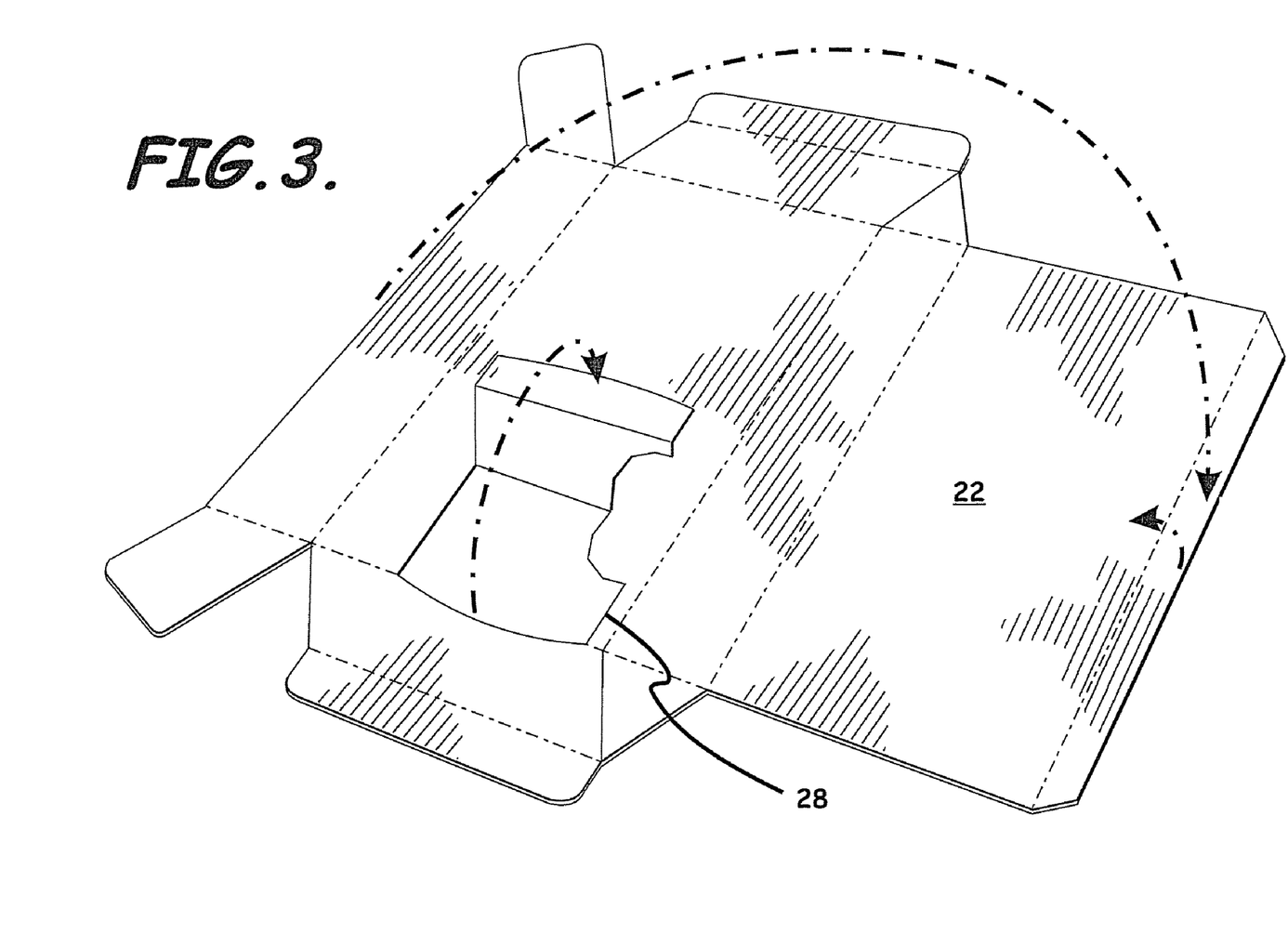
FIG. 3 is an expanded view of the kit container.
Figure 4:
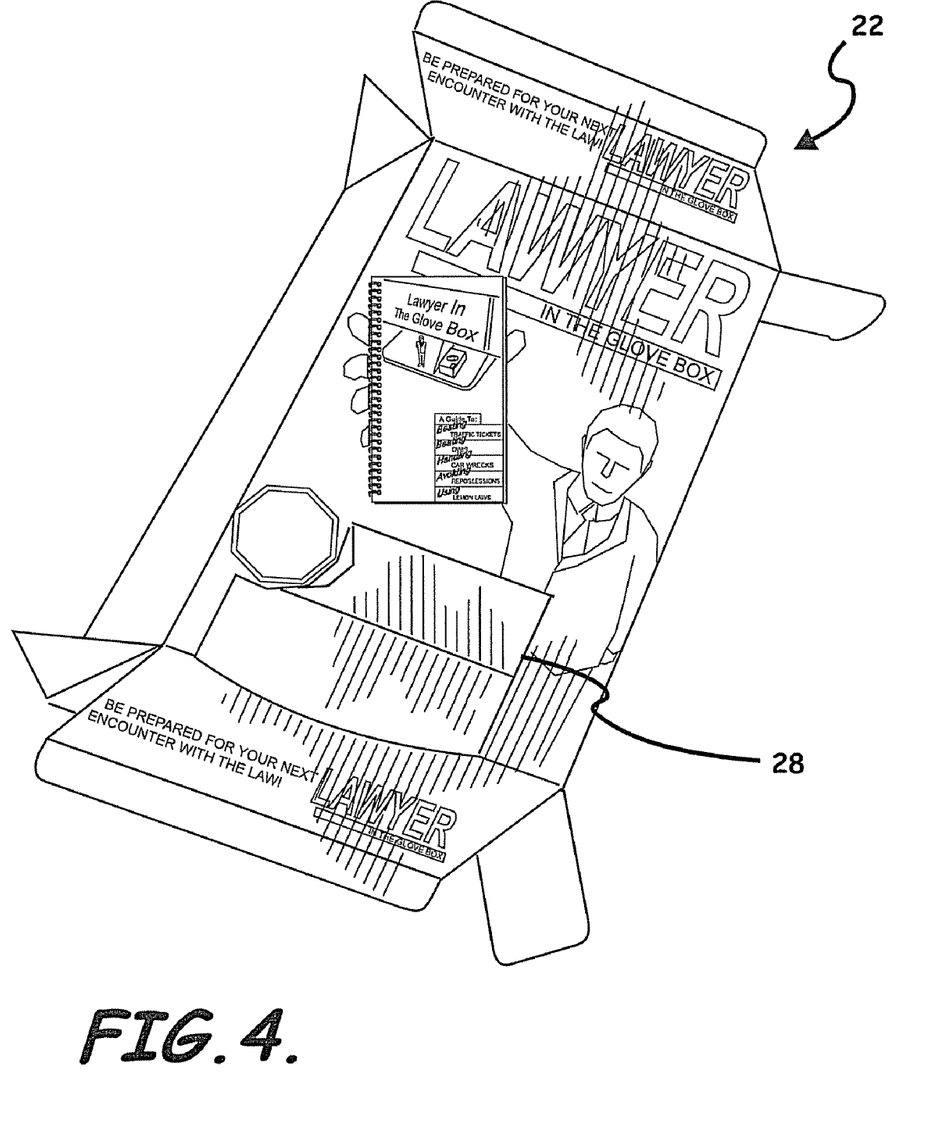
FIG. 4 shows the kit container opened at both ends.
Figure 5:
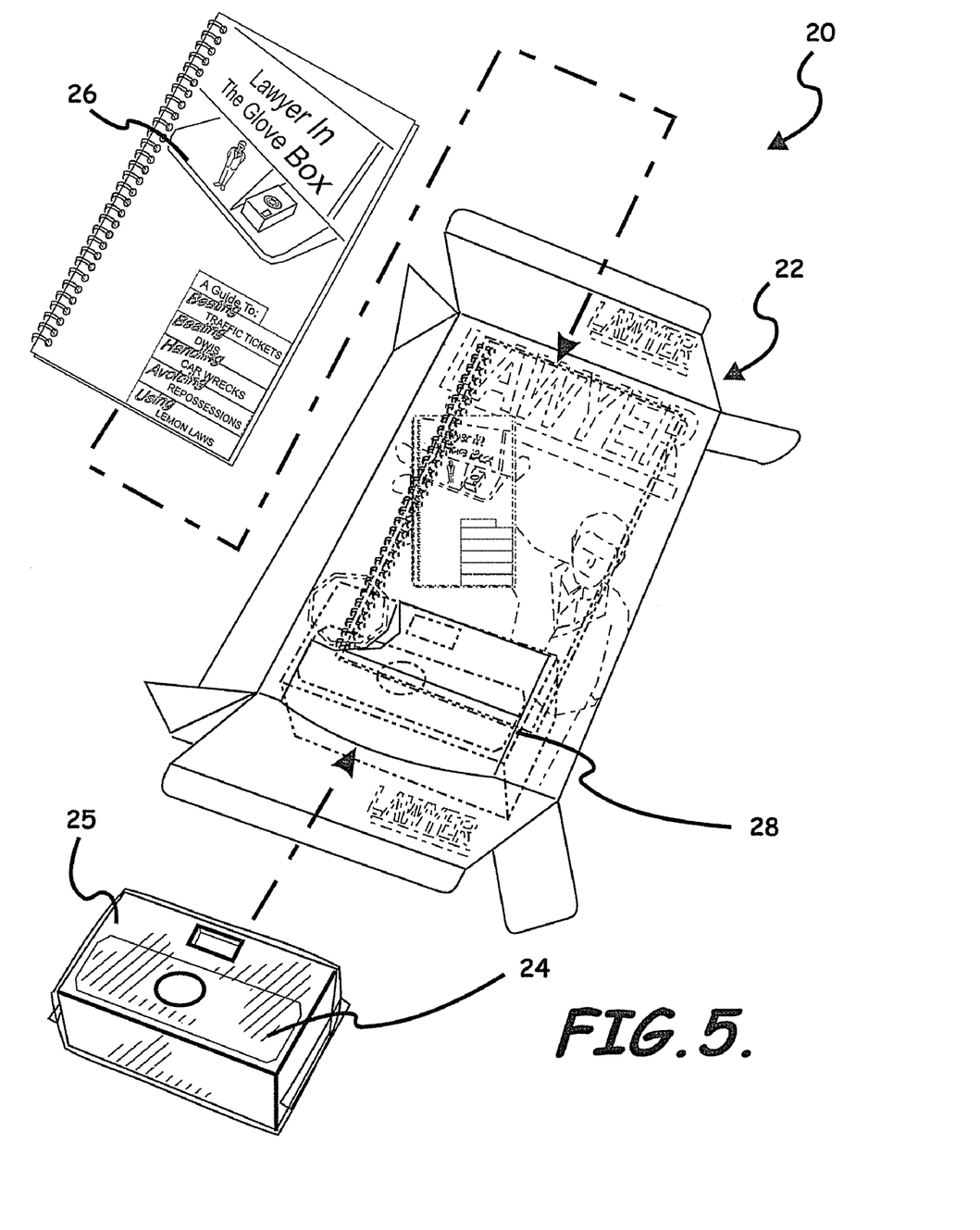
FIG. 5 illustrates how the booklet and camera fit inside the kit container.

FIGS. 2 and 5 will now be used to illustrate how the contents of the container can be used as support for the container's structure. As illustrated, one can see how the length and width of the booklet is substantially proportional to the length and width of the container and the width of the camera is substantially proportional to the width of the container. As discussed herein and illustrated in FIG. 2, the length of the booklet and container extends along the x axis, while the width of the container, booklet, and camera extend along the z axis and the thickness of the container, booklet, and camera extend along the y axis.

The size of the container 22 will now be described. In its most preferred embodiment, the length of the container is in the range of 7-11 inches, the width of the container is in the range of 4-7 inches, and the thickness of the container is in the range of 1-2.5 inches. However, those ordinary skilled in this art would realize any size which allows the kit to fit inside a vehicle glove compartment box would be sufficient and is considered encompassed within this disclosure.

Various methods of using the present invention can be envisioned. However, only a two exemplary methods have been illustrated in FIGS. 12 and 13 and steps 42-58. Other methods will now be discussed. One such method comprises the steps of inserting a camera and booklet into a container small enough to fit conveniently inside a vehicle glove box, the booklet including pre-selected legal instructions related to one or more vehicular scenarios, the one or more vehicular scenarios begin traffic tickets, DWIs, wrecks, repossessions, and lemon laws, and the booklet is further arranged in a pre-selected format to outline sequential steps to take in response to each one of the one or more vehicular scenarios and further comprises a section to write information related to the vehicular scenarios; distributing, promoting, and selling the kit; acquiring the kit; and using the kit in the various vehicular scenarios.

Another method of the present invention comprises the steps of in responding to a vehicular scenario, removing the kit from the vehicle glove compartment box, the kit comprising a container, camera, and booklet, the container being small enough to conveniently fit inside the vehicle glove compartment box; removing the camera and booklet from the container, the booklet being arrange in a pre-selected format to outline sequential steps to take in response to the one or more vehicular scenarios; using the sequential steps to assist a user in responding to the one or more vehicular scenarios; and using the camera to take photographs of data related to the one or more vehicular scenarios.

In the drawings and specification, there have been disclosed embodiments of the invention and, although specific terms are employed, they are used in a generic and descriptive sense only and not for the purpose of limitation, the scope of the invention being set forth in the following claims.

We claim:

1. A kit adapted to be positioned in a glove compartment box of a vehicle, the glove compartment box having oblique angles in an interior space thereof, the kit comprising:

a container having major portions of at least a front surface, a back surface, and two opposing side wall portions substantially parallel to each other and positioned along sides of the front surface and the back surface so that the major portions of the container define a substantially parallelogram shape having oblique angles and so that a proper fit is achieved with the oblique angles of the interior space when the container is positioned within the glove compartment box, the container also having two opposing end portions respectively extending between the front surface and the back surface along ends of the front and back surfaces so that interstitial space is positioned between the front and back surfaces and overall outer dimensions small enough to allow the container to be positioned conveniently inside the glove compartment box and being in a range of about 7-11 inches for a length, a range of about 4-7 inches for a width, and a range of about 1-2.5 inches for a thickness, the front surface of the container having an open portion of the front surface in minor portions of the container and a non-open portion of the front surface in the major portions of the container;

a camera positioned within the container so that the camera is readily visible by a user through the open portion of the front surface of the minor portion, readily visible being defined as visible without having either opposing end portion opened;

a booklet positioned within at least the major portions of the container, the booklet providing pre-selected instructions concerning a user's legal interests responsive to one or more vehicular scenarios, the instructions directing the user to record information concerning the user's legal interests responsive to the instructions and responsive to the one or more vehicular scenarios so that the information is recorded in a pre-selected section of the booklet; and wherein a length and width of the booklet are substantially proportional to the length and the width of the container, wherein a width of the camera is substantially proportional to the width of the container, and the kit further comprises an internal container support positional within the container to thereby provide structural support to the front surface of the container in the absence of objects being inserted into the container so that the container does not substantially compress when the container is positioned in the glove compartment box.

2. The kit of claim 1, wherein the container is an outer container; and wherein the camera is enclosed within an inner container so that the camera is readily visible by a user through the inner container.

3. The kit of claim 1, wherein the one or more vehicular scenarios comprise traffic tickets, driving while under the influence, wrecks, repossessions, and lemon laws.

4. The kit of claim 1, wherein the booklet is arranged in a pre-selected format to outline sequential steps to take in response to each of the one or more vehicular scenarios.

5. A kit adapted to be positioned in a glove compartment box of a vehicle, the glove compartment box having oblique angles in an interior space thereof, the kit comprising:

a container having major portions of at least a front surface, a back surface, and two opposing side wall portions substantially parallel to each other and positioned along sides of the front surface and the back surface so that the major portions of the container define a substantially parallelogram shape having oblique angles and so that a proper fit is achieved with the oblique angles of the interior space when the container is positioned within the glove compartment box, the container also having two opposing end portions respectively extending between the front surface and the back surface along ends of the front and back surfaces so that interstitial space is positioned between the front and back surfaces and overall outer dimensions small enough to allow the container to be positioned conveniently inside the glove compartment box, the front surface of the container having an open portion of the front surface in minor portions of the container and a non-open portion of the front surface in the major portions of the container;

a camera positioned within the container so that the camera is readily visible by a user through the open portion of the front surface of the minor portion, readily visible being defined as visible without having either opposing end portion opened;

a booklet positioned within at least the major portions of the container, the booklet providing pre-selected instructions concerning a user's legal interests responsive to one or more vehicular scenarios, and wherein a length and width of the booklet are substantially proportional to the length and the width of the container, wherein a width of the camera is substantially proportional to the width of the container, and the kit further comprises an internal container support positioned within the container to thereby provide structural support to the front surface of the container in the absence of objects being inserted into the container so that the container does not substantially compress when the container is positioned in the glove compartment box.

6. The kit of claim 5, wherein the pre-selected instructions direct the user to record information concerning the user's legal interests responsive to the instructions and responsive to the one or more vehicular scenarios so that the information is recorded in a pre-selected section of the booklet.

7. The kit of claim 5, wherein the container is an outer container; and wherein the camera is enclosed within an inner container so that the camera is readily visible by a user through the inner container.

8. The kit of claim 5, wherein the one or more vehicular scenarios comprise traffic tickets, driving while under the influence, wrecks, repossessions, and lemon laws.

9. The kit of claim 5, wherein the booklet is arranged in a pre-selected format to outline sequential steps to take in response to each of the one or more vehicular scenarios.

* * * * *